US012792433B2

(12) United States Patent
Jain

(10) Patent No.: US 12,792,433 B2
(45) Date of Patent: Nov. 10, 2026

(54) CONTEXTUAL APPLICATION PROGRAMMING INTERFACE GATEWAY

(71) Applicant: SAP SE, Walldorf (DE)

(72) Inventor: Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 402 days.

(21) Appl. No.: 18/402,086

(22) Filed: Jan. 2, 2024

(65) Prior Publication Data

US 2025/0217216 A1 Jul. 3, 2025

(51) Int. Cl.
*G06F 9/54* (2006.01)

(52) U.S. Cl.
CPC .................................... *G06F 9/547* (2013.01)

(58) Field of Classification Search
CPC ........ G06F 9/547; G06F 9/5083; G06F 9/541; G06F 8/71; H04L 67/56; H04L 67/133
See application file for complete search history.

(56) References Cited

U.S. PATENT DOCUMENTS 11,080,105 B1 8/2021 Birkett et al.
11,455,198 B1 * 9/2022 Singh ...................... G06F 9/541
12,500,887 B1 * 12/2025 Pinski ................. H04L 63/0876
2019/0114417 A1 * 4/2019 Subbarayan ............ H04L 41/16
2020/0220875 A1 * 7/2020 Harguindeguy ...... H04L 63/101
2020/0336467 A1 10/2020 Subbarayan et al.
2021/0152555 A1 * 5/2021 Djosic .................... G06N 20/00
2021/0406102 A1 12/2021 Seetharaman et al.
2023/0117895 A1 * 4/2023 Kruszewski ......... G01C 21/343 701/412
2024/0214348 A1 * 6/2024 Benameur ........... H04L 63/0236
2024/0420110 A1 * 12/2024 Kurani .................... G06F 9/541

OTHER PUBLICATIONS

"European Application No. 24196562.3 Extended European Search Report mailed on Mar. 5, 2025", 10 pgs.

* cited by examiner

*Primary Examiner* — Sisley N Kim
(74) *Attorney, Agent, or Firm* — SCHWEGMAN LUNDBERG & WOESSNER, P.A.

(57) ABSTRACT

Various examples are directed to systems and methods for implementing an Application Programming Interface (API) gateway. The API gateway may receive an API call directed to an exposed API associated with a backend system. The API gateway may execute a trained computerized model based at least in part on the API call, and at least in part on API call contextual data associated with the API call. The API gateway may determine a routing action for the API call based at least in part on an output of the trained computerized model perform the routing action for the API call.

20 Claims, 10 Drawing Sheets

CONTEXTUAL APPLICATION PROGRAMMING INTERFACE GATEWAY

BACKGROUND

An application programming interface (API) gateway is a computer implemented component that is positioned between an exposed API and users or other systems that utilize the exposed API. API calls intended for the exposed API are directed to the API gateway. The API gateway may be configured to apply one or more policies to incoming API calls. Provided that the API call is consistent with the applied policies, the API gateway may route the API call to the exposed API.

BRIEF DESCRIPTION OF DRAWINGS

The present disclosure is illustrated by way of example and not limitation in the following figures.

DETAILED DESCRIPTION

Various examples described herein are directed to application programming interface (API) gateway that is configured to handle API calls to an exposed API in a dynamic manner based on contextual data. For example, many API gateways are arranged to apply policies as predefined rules that do not consider the context of the API call. For example, the API gateway may apply a predefined throttling rule to API calls. If a particular originating user or system makes more than a threshold number of API calls during a given time period, then subsequent API calls from that originating user or system may be throttled. In another example, an API gateway may apply a predefined static rule to API calls. API calls from originating users or systems indicated by the static rule may be routed to the exposed API while other API calls are throttled.

An API gateway applying predefined rules without consideration of contextual data may be suitable for some applications. For example, a backend server or other system utilizing an exposed API may process API calls based on static, predefined rules of the API gateway and/or may apply an additional logic at the backend. In some examples, however, this may consume resources at the backend system and/or limit the flexibility of the backend system altogether.

Various examples address these and other challenges utilizing a contextual API gateway. The API gateway may be configured to execute a trained computerized model. The API gateway may receive an API call directed to an exposed API. In response, the API gateway may execute a trained computerized model. The input to the trained computerized model may include contextual data associated with the API request. The contextual data may describe, for example, data describing an originating user of the API call, network load data describing a load of at least one network between the API gateway and the exposed API, communication session data describing a type of communication cession associated with the API call, network data describing a network from which the API call originated, geographic data describing a geographic location from which the API call originated, version data describing a version of a sending application associated with the API call, time data describing a time and date when the API call was made, and/or the like.

The output of the trained computerized model may be used by the API gateway to determine a routing action for the API call. For example, the API call may be routed to a server associated with the exposed API or may be denied. In some examples, the routing action may include generating content data describing content to be provided in response to the API call and sending the API call and the content data to the exposed API. In some examples, the routing action may include performing a particular authentication process prior to routing the API call to the exposed API. Various other routing actions may be indicated by the trained computerized model output.

Figure 1:
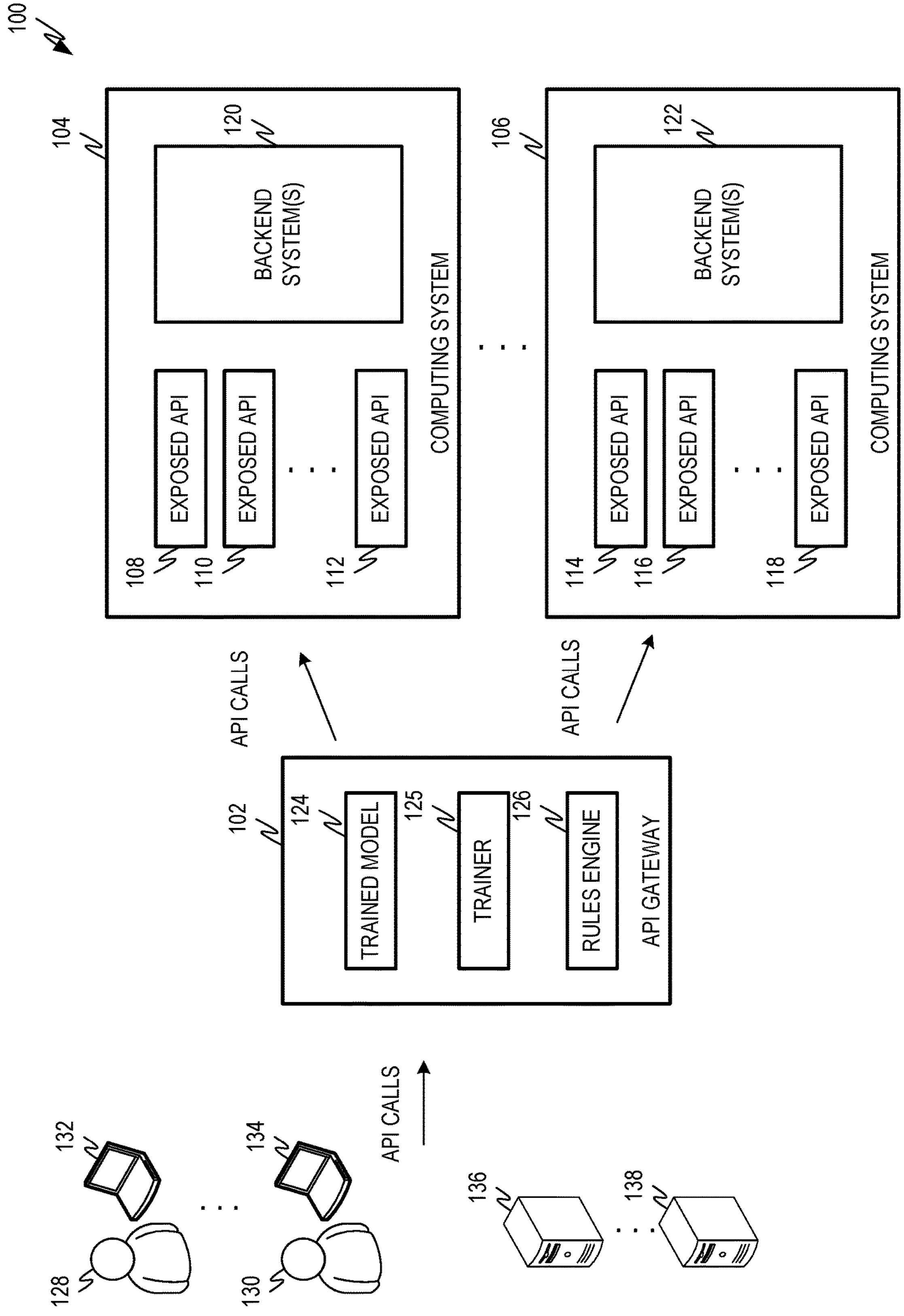
FIG. 1 is a diagram showing one example of an environment comprising an Application Programming Interface (API) gateway servicing one or more computing systems.

FIG. 1 is a diagram showing one example of an environment 100 comprising an API gateway 102 servicing one or more computing systems 104, 106. The API gateway 102 may receive API calls from various API call originators. For example, some API calls may originate from originating users 128, 130 via a user computing devices 132, 134. User computing devices 132, 134 may be and/or include various different types of computing devices such as, for example, desktop computers, laptop computers, tablet computers, mobile computing devices, and/or the like. Also, in some examples, one or more API calls may be received from originating applications executing at one or more originating computing systems 136, 138.

API calls received by the API gateway 102 may be directed to one or more exposed APIs 108, 110, 112, 114, 116, 118. The exposed APIs 108, 110, 112, 114, 116, 118 may be associated with one or more backend systems 120, 122 at the one or more computing systems 104, 106. The API gateway 102 may receive the respective API calls, determine a routing action for each respective API call, and execute the routing action.

The computing systems 104, 106 may comprise the respective backend systems 120, 122 that implement various software applications and/or services that involve interaction with one or more users 128, 130 and/or originating computing systems 136, 138.

The computing systems 104, 106 may expose the respective exposed APIs 108, 110, 112, 114, 116, 118 to facilitate interaction between one or more software applications executed at the respective backend systems 120, 122 and originating users 128, 130 and/or originating computing systems 136, 138. In some examples, a backend system 120, 122 may expose different APIs 108, 110, 112, 114, 116, 118. For example, different APIs 108, 110, 112, 114, 116, 118 may be exposed to provide different functionality to users 128, 130 and/or originating computing systems 136, 138. Also, in some examples, different exposed APIs 108, 110, 112, 114, 116, 118 may correspond to different levels of service, different networks, different geographic regions, and/or the like. In some examples, different exposed APIs 108, 110, 112, 114, 116, 118 may correspond to different versions of an originating software application, for example, executed in a user computing device 132, 134 or originating computing system 136, 138.

API calls directed to one or more of the exposed APIs 108, 110, 112, 114, 116, 118 may be first directed to the API gateway 102. The API gateway 102 may determine a routing action for each API call based on contextual data, for example, as described herein. In this way, the computing systems 104, 106 and exposed APIs 108, 110, 112, 114, 116, 118 may consume API gateway services provided by the API gateway 102.

Consider an example in which the backend system 120 executes an electronic or e-commerce application. Users 128, 130 may access the e-commerce application to purchase products and/or services. In some examples, the backend system 120 may expose the exposed API 108 to implement a shopping cart function. For example, calls to the exposed API 108 may be made to add items to a user shopping cart, subtract items from a user shopping cart, implement an order for one or more items in the user shopping cart, and/or the like. The backend system 120 may expose the exposed API 110 to provide a catalog function. API calls directed to the exposed API 110, then, may request a display of one or more goods or services for sale through the e-commerce application. In some examples, different exposed APIs may be tailored to different devices. For example, the exposed API 110 may be configured to respond to catalog function request from mobile devices while the exposed API 112 may be configured to respond to catalog function requests from desktop devices.

Consider another example in which the backend system 122 provides a social media application. The social media application may expose the exposed API 114 to receives API calls from originating users 128, 130 requesting a personalized feed. The social media application may also expose the exposed API 118 to receives search queries from one or more originating users 128, 130. As described, different exposed APIs 114, 116, 118 may be arranged to provide different services to originating users 12A, 130 and originating computing systems 136, 138, to serve different geographic areas, to serve different versions of originating applications, and/or the like.

The API gateway 102 and computing systems 104, 106 may be executed at any suitable computing system. In some examples, the API gateway 102 is executed at an on-premise environment. An on-premise environment comprises one or more computing systems maintained by the provider of the API gateway 102. For example, the provider may generate code for executing the API gateway 102 and execute the code at the on-premise environment. Users 128, 130 may access the on-premise computing system remotely via user computing devices 132, 134.

In some examples, the API gateway 102 is executed at a private cloud environment. In a private cloud environment, a cloud service provider gives access to computing hardware such as servers, data storage, and/or the like. The customer enterprise provides software in data that is executed and stored at the private cloud environment. For example, in a private cloud implementation, the developer of the API gateway 102 may provide the private cloud environment with executable code for implementing the API gateway 102.

In some examples, the API gateway 102 may be executed in a public cloud environment. A public cloud environment includes one or more servers or other computing hardware. The public cloud environment may be arranged into a number of tenancies implemented by a cloud service provider. Each tenancy may be associated with a customer enterprise and accessible by users associated with that customer enterprise. The cloud service provider may provide one or more executables, basis data, and/or other components to implement the API gateway 102.

The computing systems 104, 106 may similarly be executed at any suitable computing systems including, on-premise environments, private cloud environments, and/or public cloud environments. In some examples, the API gateway 102 is executed at one tenancy of a public cloud environment while all or part of the computing systems 104, 106 are executed at other tenancies of the same or a different public cloud environment.

The API gateway 102 may include a trained computerized model 124, a trainer subsystem 125, and/or a rules engine 126. The trained computerized model 124 may be or include any sort of trained computerized model architecture. In some examples, the trained computerized model 124 may be or include a logistic regression model, a decision tree model, a random forest model, a support vector machine model, a K-nearest neighbors model, a gradient boosting model, an Adaptive Boosting (AdaBoost) model, a neural network model, an extreme Gradient Boosting (XGBoost) model, and/or the like.

The trained computerized model 124 may be trained to receive an API call (and/or description thereof) and API call contextual data as input. An output of the trained computerized model 124 may indicate a routing action for the input API call. The routing action may include routing the API call to a particular exposed API 108, 110, 112, 114, 116, 118. The routing action may also include various other operations. For example, the routing action may include determining content that should be provided in response to the API call. Accordingly, the API gateway 102 may generate content data describing the content that should be provided in response to the API call. The API gateway 102 may forward the API call and the content data to the exposed API 108, 110, 112, 114, 116, 118 to which the API call was directed. In some examples, the routing action may involve throttling or denying the API call. This may be done, for example, by failing to forward the API call to any of the exposed APIs 108, 110, 112, 114, 116, 118.

In some examples, the routing action may include performing an authentication process before routing the API call to an appropriate exposed API 108, 110, 112, 114, 116, 118. The type of authentication process to be performed may be based on an output of the trained computerized model 124. For example, the output of the trained computerized model may indicate that some API calls should be subjected to multi-factor authentication, whereas others may be subjected to a single factor authentication.

In some examples, the routing action may include directing the API call to a particular exposed API 108, 110, 112, 114, 116, 118. For example, the routing action may be based on a version of a software application making the API call. The output of the trained computerized model 124 may indicate a particular exposed API 108, 110, 112, 114, 116, 118 that is best suited to handle the call from that software application or version thereof. Also, in some examples, the routing action may include routing the API call to a backup server or backup exposed API 108, 110, 112, 114, 116, 118, for example, if the context data indicates an error or other failure at a primary server or exposed API 108, 110, 112, 114, 116, 118.

In some examples, the API gateway 102 may implement a trainer subsystem 125. The trainer subsystem 125 may be executed, for example, as described herein, to train the trained computerized model 124 using training data. In some examples, the API gateway 102 also includes a rules engine 126. The rules engine 126 may apply one or more rules to the API call. In some examples, the routing action for particular API call may be based on an application of the rules engine 126 and the output of the trained computerized model 124. In some examples, the rules engine 126 is programmed to implement rules that are generated by the trained computerized model 124.

Figure 2:
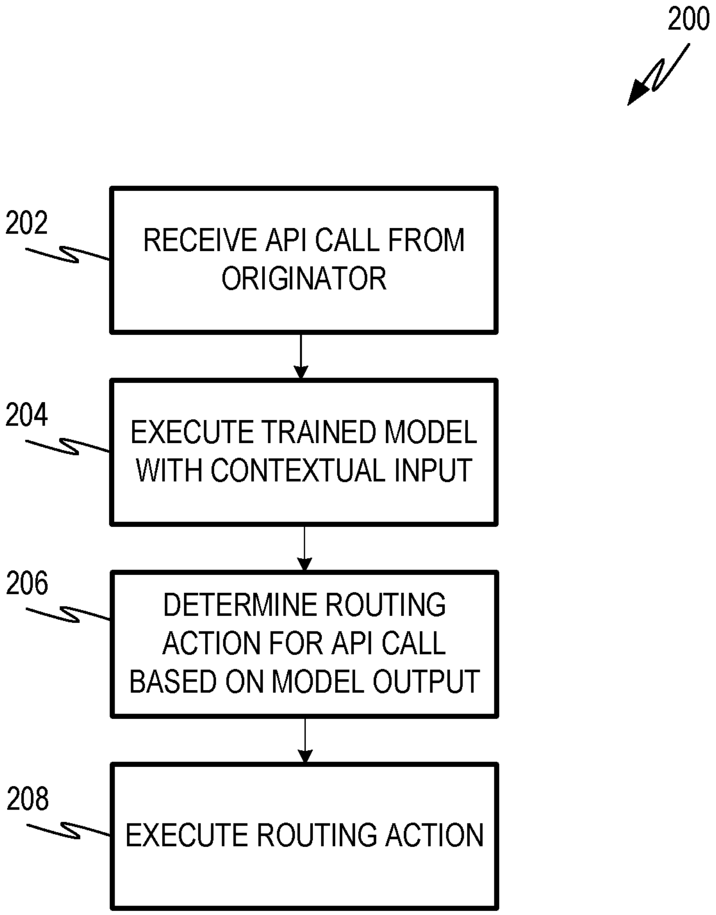
FIG. 2 is a flowchart showing one example of a process flow that may be executed by the API gateway of FIG. 1, to select and execute a routing action for an incoming API call.

FIG. 2 is a flowchart showing one example of a process flow 200 that may be executed by an API gateway, such as the API gateway 102 of FIG. 1, to select and execute a routing action for an incoming API call. At operation 202, the API gateway 102 may receive an API call from an API call originator. The API call originator may be, for example, an originating user 128, 130 (via a user computing device 132, 134 and originating application executing thereon) or an originating computing system 136, 138 (via an originating application executing thereon).

At operation 204, the API gateway 102 executes the trained computerized model 124. The trained computerized model 124 is executed based on API call contextual data. The API call contextual data describes context of the API call. Various different types of API call contextual data may be used. In some examples, when the API call originator is an originating user 128, 130, the API call contextual data may include originating user data describing the originating user 128, 130. The originating user data may include, for example, user history data describing past API calls made by the originating user and/or other users associated with a common account or common enterprise. The originating user data may also include user preference data describing at least one preference of the originating user 128, 130. Also, in some examples, the originating user data may include a count data describing an account associated with the originating user 128, 130.

In some examples, the contextual data may also include network load data. Network load may describe a load on one or more networks positioned between the API gateway 102 and the computing system 104, 106 to which the API calls is directed. For example, there may be multiple network or multiple network pads between the API gateway 102 and the computing system 104, 106 to which the API call is directed. Network load data may indicate to the API gateway 102 a network or network paths to utilize and/or avoid.

In some examples, the contextual data may also include communication session data describing a type of communication session that is associated with the API call. For example, communication session data may indicate that the API call is associated with a live event, such as a stream video, audio, or similar session. Such communication session data may indicate to the API gateway 102 that the API request should be prioritized over other API requests that are not part of the live event.

In some examples, the contextual data may comprise geographic data describing a geographic location of the originator of the API call. In some examples, the contextual data may comprise network data describing a network from which the API call originator, or through which the API call passed before reaching the API gateway 102. In some examples, this may indicate a level of authentication or other security to be applied to the API call. In some examples, the contextual data may include version data describing a version of a sending application that originated the API call. Also, in some examples, the contextual data may include time data describing a time of day, day of the week, or other indicator of when the API call was sent.

At operation 204, the API gateway 102 executes the trained computerized model 124 using the contextual data as input. An output of the trained computerized model 124 may indicate a routing action for the API call. At operation 206, the API gateway 102 may determine the routing action for the API call based on the output of the trained computerized model 124. At operation 208, the API gateway 102 may execute the determined routing action.

Figure 3:
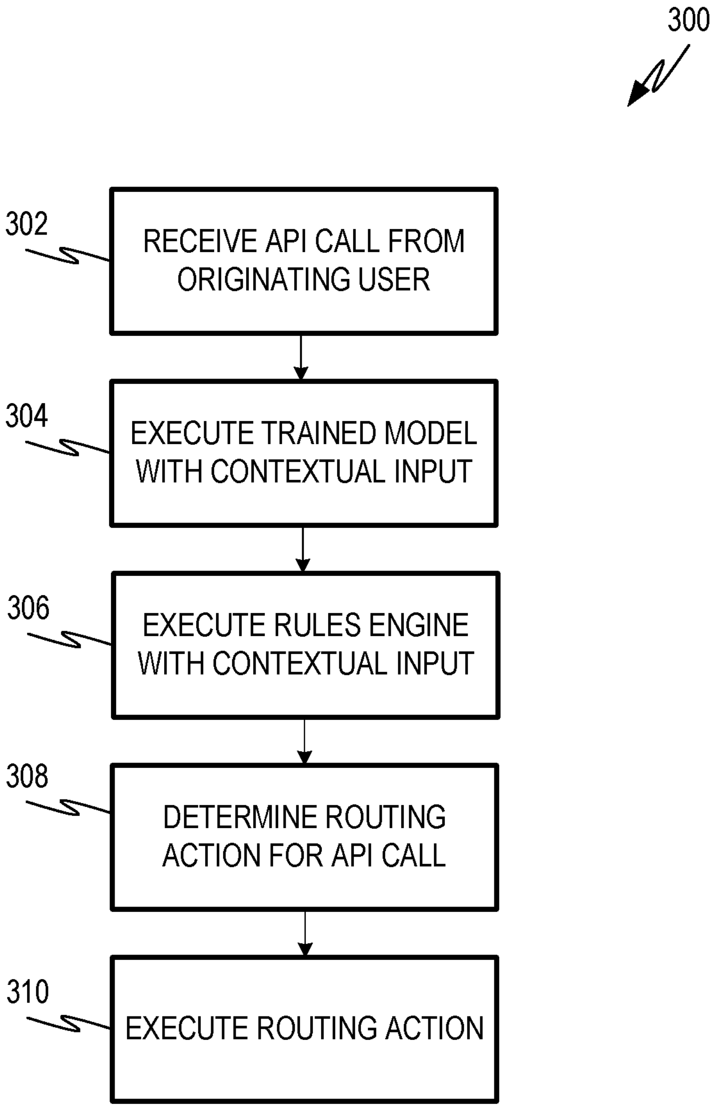
FIG. 3 is a flowchart showing another example of a process flow that may be executed by the API gateway of FIG. 1, to select and execute a routing action for an incoming API call.

FIG. 3 is a flowchart showing one example of a process flow 300 that may be executed by an API gateway, such as the API gateway 102 of FIG. 1, to select and execute a routing action for an incoming API call. The process flow 300 shows an arrangement that utilizes the trained computerized model 124 and the rules engine 126. At operation 302, the API gateway 102 may receive an API call from an API call originator. The API call originator may be, for example, an originating user 128, 130 (via a user computing device 132, 134 and originating application executing thereon) or an originating computing system 136, 138 (via an originating application executing thereon).

At operation 304, the API gateway 102 executes the trained computerized model 124. In some examples, the trained computerized model 124 is executed based on contextual data describing the API call, for example, as described herein. In some examples, the output of the trained computerized model may also indicate one or more rules to be applied to the API call by the rules engine 126.

At operation 306, the API gateway 102 may execute the rules engine 126 using contextual data as input. The rules engine 126 may apply one or more contextual rules to the API call. In some examples, one or more rules implemented by the rules engine 126 may be determined based on an output of the trained computerized model executed at operation 304.

At operation 308, the API gateway 102 may determine a routing action for the API call. The routing action for the API call, in some examples, may be based on an output of the rules engine 126, an output of the trained computerized model 124, and/or both. At operation 310, the API gateway 102 may execute the determined routing action.

FIGS. 4-8 are process flows showing examples of how the API gateway 102 may respond to various API calls. The various FIGS. 4-8 describe routing actions for an API call that include different operations. It will be appreciated that, in some examples, the API gateway 102 may determine routing actions that include any suitable combination of the routing actions described in FIGS. 4-8.

Figure 4:
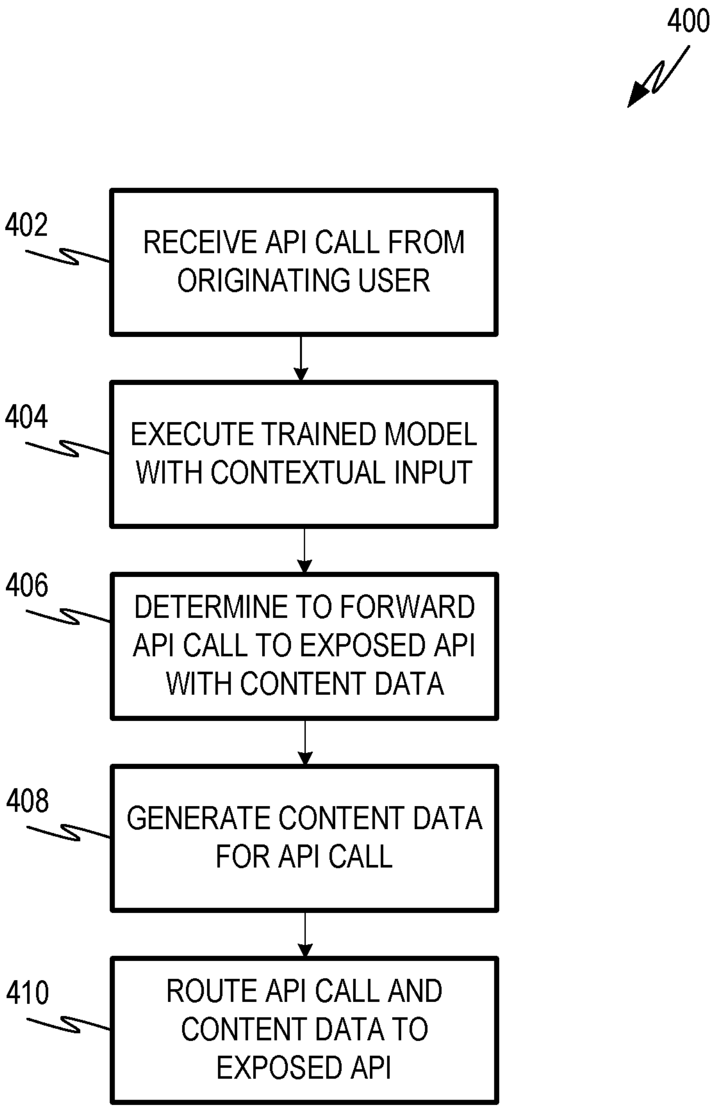
FIG. 4 is a flowchart showing another example of a process flow that may be executed by the API gateway of FIG. 1, to select and execute a routing action for an incoming API call.

FIG. 4 is a flowchart showing one example of a process flow 400 that may be executed by an API gateway, such as the API gateway 102 of FIG. 1, to select and execute a routing action for an incoming API call. In the example of FIG. 4, the routing action includes generating content data describing content that should be returned in response to the API call.

At operation 402, the API gateway 102 may receive an API call from an API call originator. The API call originator may be, for example, an originating user 128, 130 (via a user computing device 132, 134 and originating application executing thereon) or an originating computing system 136, 138 (via an originating application executing thereon). At operation 404, the API gateway 102 executes the trained computerized model 124. In some examples, the trained computerized model 124 is executed based on contextual data describing the API call, for example, as described herein.

At operation 406, the API gateway 102 determines a routing action for the API calls that includes forwarding the API call to an exposed API 108, 110, 112, 114, 116, 118 with content data. In some examples, the identity of exposed API 108, 110, 112, 114, 116, 118 to which the API call will be forwarded and a determination that the API call will be forwarded with content data may be based on an output of the trained computerized model.

At operation 408, the API gateway 102 may generate content data. The content data may describe content that should be returned to the originator of the API call in response to the API call. Consider an example in which the originator of the API call is an originator user 128, 130 and the API call is to a social media or other content service. Content data may be determined, for example, based on contextual data indicating a preference of the originating user 128, 130, past behavior of the originating user 12A, 130, and/or the like. In some examples, the content data may be generated based on an output of the trained computerized model 124. At operation 410, the API gateway 102 routes the API call to an appropriate exposed API 108, 110, 112, 114, 116, 118 with the determined content data.

Figure 5:
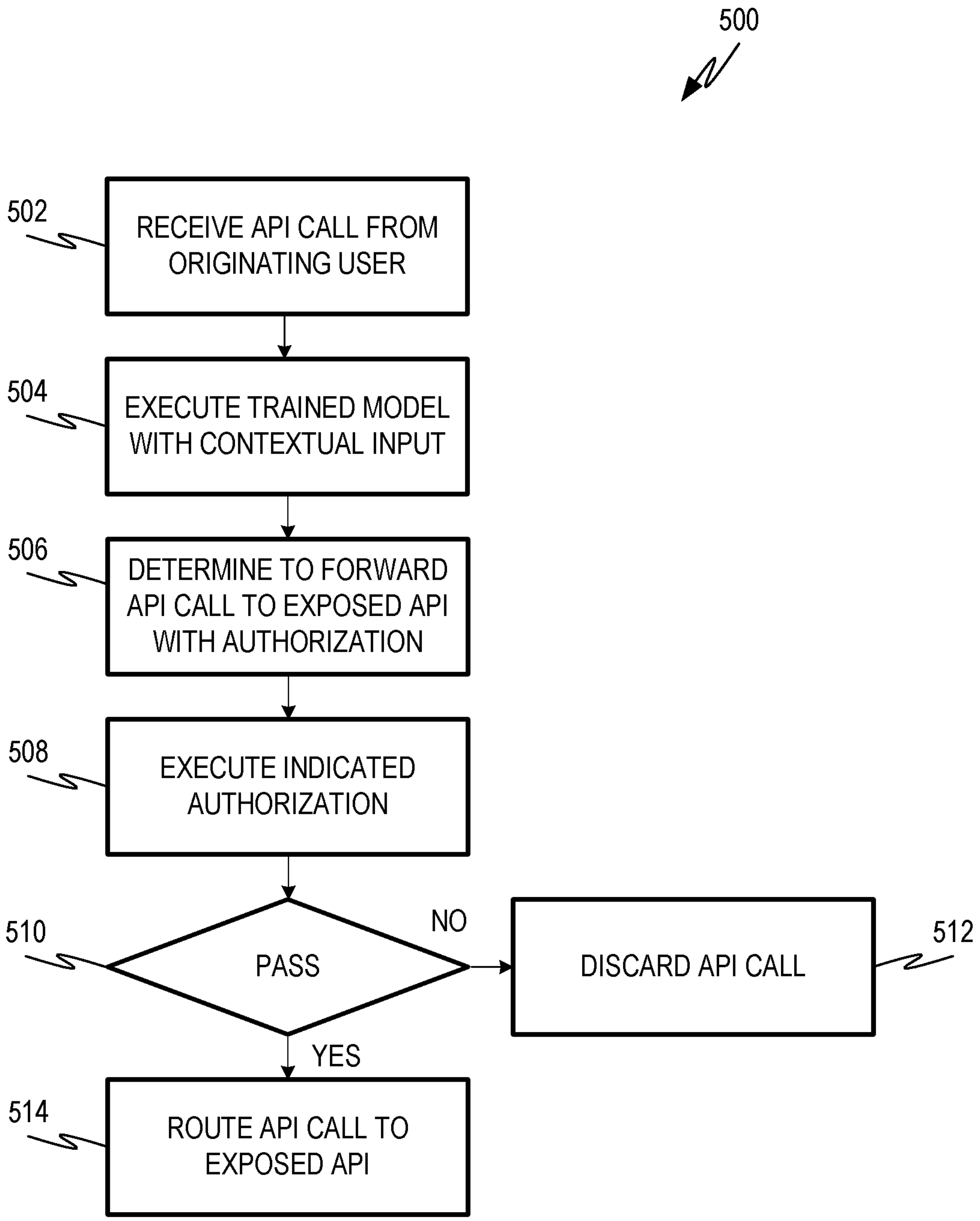
FIG. 5 is a flowchart showing another example of a process flow that may be executed by the API gateway of FIG. 1, to select and execute a routing action for an incoming API call.

FIG. 5 is a flowchart showing one example of a process flow 500 that may be executed by an API gateway, such as the API gateway 102 of FIG. 1, to select and execute a routing action for an incoming API call. In the example of FIG. 5, the routing action includes prompting and/or performing an authorization process for the API call. This may ensure that the API call is legitimate.

At operation 502, the API gateway 102 may receive an API call from an API call originator. The API call originator may be, for example, an originating user 128, 130 (via a user computing device 132, 134 and originating application executing thereon) or an originating computing system 136, 138 (via an originating application executing thereon). At operation 504, the API gateway 102 executes the trained computerized model 124. In some examples, the trained computerized model 124 is executed based on contextual data describing the API call, for example, as described herein.

At operation 506, the API gateway 102 determines to forward the API call to an exposed API 108, 110, 112, 114, 116, 118 with authorization. For example, an output of the trained computerized model 124 may indicate that the API call should be subjected to an authorization process and/or a particular authorization process to which the API calls should be subjected. The output of the 124 may also indicate the exposed API 108, 110, 112, 114, 116, 118 to which the API calls should be routed.

At operation 508, the API gateway 102 may execute the indicated authorization process. The indicated authentication process may be any suitable type of authentication process such as, for example, a multifactor authentication process, a single factor authentication process, and/or the like. Examples of single authentication processes include, passwords, personal identification numbers (PINs), and/or the like. The API gateway 102 may perform the authorization process and/or may send a message to the originator of the API call requesting that the originator perform the authentication process at a third-party provider such as, for example, a certificate of authority or other suitable authentication provider. At operation 510, the API gateway 102 determines if the originator of the API call passed the authentication process. If the originator of the API call passed the authentication process, then the API gateway 102 may pass the API call to the appropriate exposed API 10A, 110, 112, 114, 116, 118 at operation 514. If the originator of the API call does not pass the authentication process, then the API gateway 102 may discard the API call at operation 512.

Figure 6:
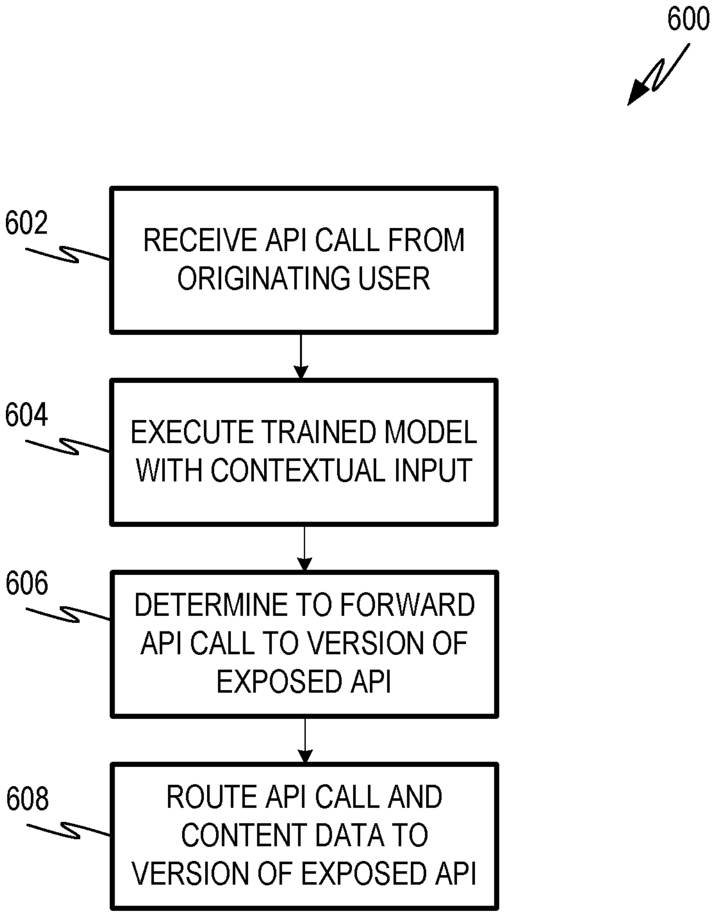
FIG. 6 is a flowchart showing another example of a process flow that may be executed by the API gateway of FIG. 1, to select and execute a routing action for an incoming API call.

FIG. 6 is a flowchart showing one example of a process flow 600 that may be executed by an API gateway, such as the API gateway 102 of FIG. 1, to select and execute a routing action for an incoming API call. In the example of FIG. 6, the routing action includes selecting a particular version of an exposed API 108, 110, 112, 114, 116, 118.

At operation 602, the API gateway 102 may receive an API call from an API call originator. The API call originator may be, for example, an originating user 128, 130 (via a user computing device 132, 134 and originating application executing thereon) or an originating computing system 136, 138 (via an originating application executing thereon). At operation 604, the API gateway 102 executes the trained computerized model 124. In some examples, the trained computerized model 124 is executed based on contextual data describing the API call, for example, as described herein.

At operation 606, the API gateway 102 determines to forward the API call to a selected version of an exposed API 108, 110, 112, 114, 116, 118. The selected version may be indicated by the output of the trained computerized model. In some examples, the output of the trained computerized model 124 may indicate the exposed API version to which the API calls should be directed. This may be determined based on contextual data provided as input to the trained computerized model such as, for example, a version of the application executing on the user computing device 132, 134 or originating computing system 136, 138 that originated the API call. At operation 608, the API gateway 102 may route the API call to the indicated exposed API version.

Figure 7:
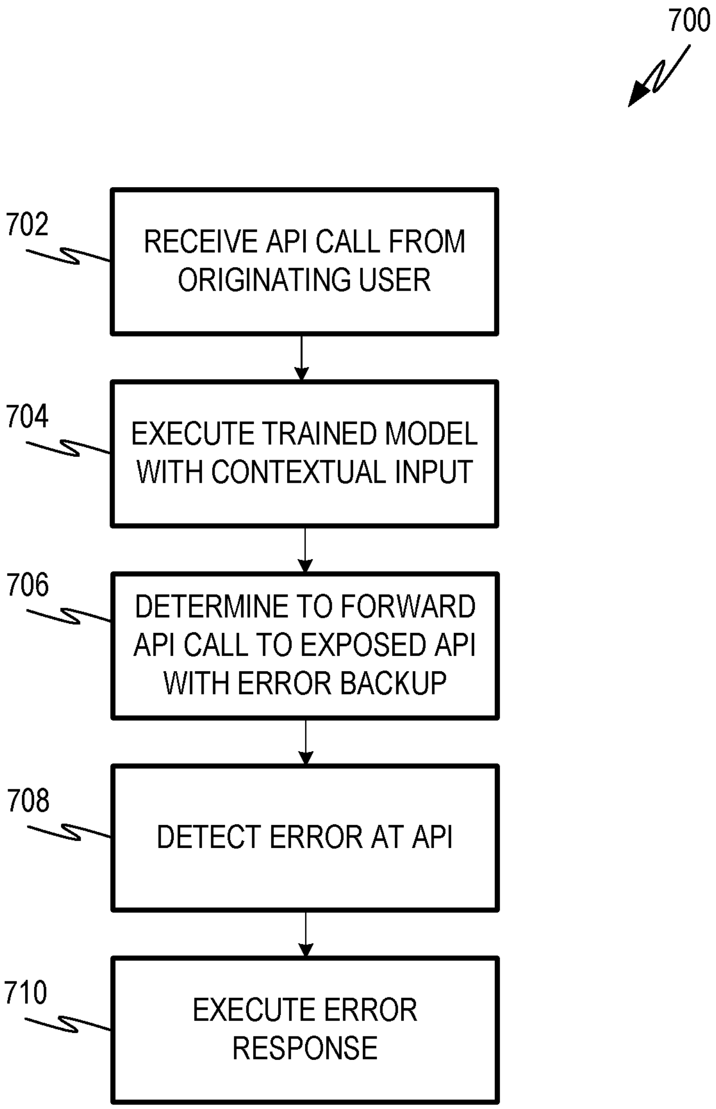
FIG. 7 is a flowchart showing another example of a process flow that may be executed by the API gateway of FIG. 1, to select and execute a routing action for an incoming API call.

FIG. 7 is a flowchart showing one example of a process flow 700 that may be executed by an API gateway, such as the API gateway 102 of FIG. 1, to select and execute a routing action for an incoming API call. In the example of FIG. 7, the routing action includes detecting in error in an exposed API 108, 110, 112, 114, 116, 118 and routing the API call to a backup server for the exposed API 108, 110, 112, 114, 116, 118.

At operation 702, the API gateway 102 may receive an API call from an API call originator. The API call originator may be, for example, an originating user 128, 130 (via a user computing device 132, 134 and originating application executing thereon) or an originating computing system 136, 138 (via an originating application executing thereon). At operation 704, the API gateway 102 executes the trained computerized model 124. In some examples, the trained computerized model 124 is executed based on contextual data describing the API call, for example, as described herein.

At operation 706, the API gateway 102 determines to forward the API call to an exposed API that has an associated error backup server. At operation 708, the API gateway 102 may detect an error at the exposed API. In some examples, the error is detected based on an output of the trained computerized model 124. For example, the trained computerized model 124 may predict the error at the exposed API based on the contextual data. At operation 708, the API gateway 102 detects an error at the exposed API to which the API call is to be forwarded. In some examples, the output of the trained computerized model 124 indicates the error. The API gateway 102 may determine an error response. The error response may include, for example, declining or failing the API call and/or forwarding the API call to a backup server associated with the same backend system 120, 122 as the erroneous exposed API. At operation 710, the API gateway 102 may execute the error response.

Figure 8:
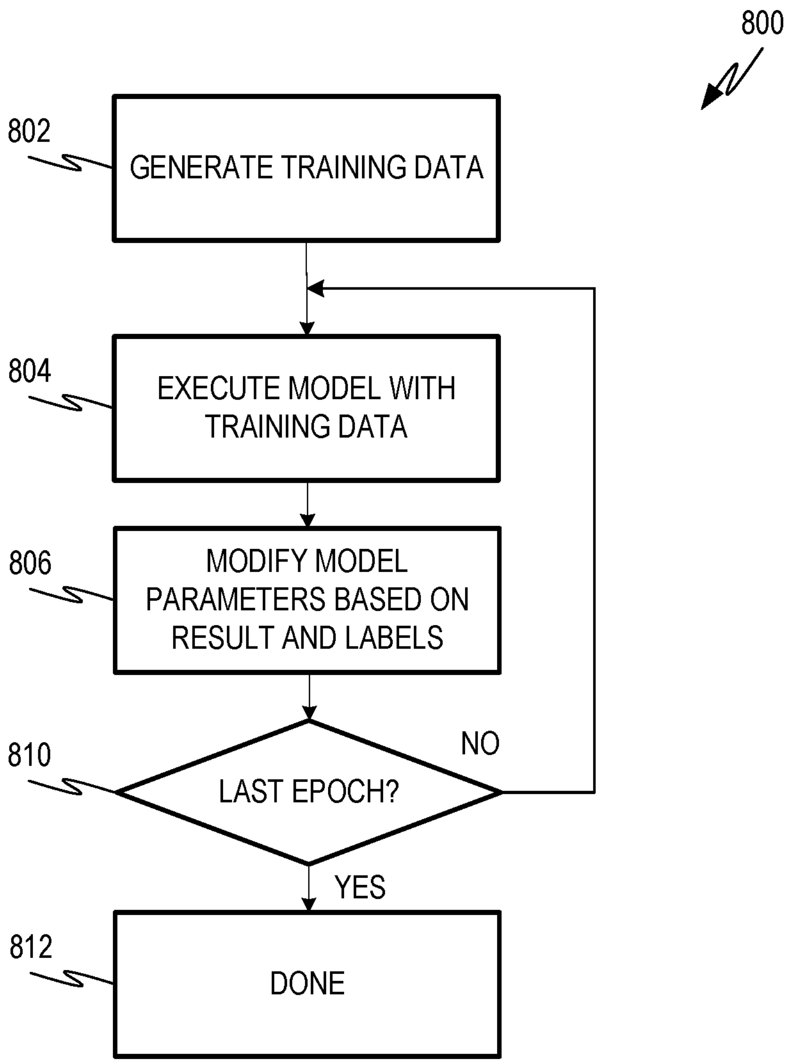
FIG. 8 is a process flow that may be executed to train the trained computerized model to determine routing actions for API calls to the API gateway of FIG. 1.

FIG. 8 is a process flow 800 that may be executed to train the trained computerized model 124. In some examples, the process flow 800 is executed by the trainer subsystem 125 of the API gateway 102. It other examples, the process flow 800 is executed by another computing system. Accordingly, the trained computerized model 124, in some examples, may be loaded to the API gateway 102 after it is already trained.

At operation 802, the trainer subsystem 125 generates training data for training the trained computerized model 124. The training data describes actual or hypothetical API calls and associated contextual data. The training data may also include a label for each respective API call. The label indicates a desired routing action for the API call. For example, the label may indicate an exposed API 108, 110, 112, 114, 116, 118 to which the API calls should be routed. The label may also describe other operations that are part of the desired routing action such as, for example, generating content data for the API call, an authorization process for the API call, a version of exposed API to which the API calls should be directed, an indication of an error at the exposed API and/or an associated backup server. Labels for the training data may be determined based on log data describing a disposition of previous API calls and/or may be generated and/or modified by a human user.

At operation 804, the trainer subsystem 125 may execute the trained computerized model 124 using a portion of the training data as input. This may result in an output of the trained computerized model 124. At operation 806, the trainer subsystem 125 may modify the trained computerized model based on the output generated at operation 804 and labels associated with the training data. For example, the trainer subsystem 125 may compare the output of the trained computerized model 124 to the label data and determine corresponding changes to the trained computerized model to minimize a difference between the output of the trained computerized model 124 and the training data. Any suitable technique may be used to determine an error between the model output and the label data and generate changes. In some examples, the trainer subsystem 125 is configured to apply a gradient descent technique to a loss function describing a difference between the result of the trained computerized model 124 and the label(s) of the corresponding training data.

At operation 810, the trainer subsystem 125 may determine if it has executed a last epoch of the training. If not, the trainer subsystem 125 may return to operation 804 and execute the model again with additional training data. If the current epoch is the last training epoch, then the training may be completed at operation 812.

In view of the disclosure above, various examples are set forth below. It should be noted that one or more features of an example, taken in isolation or combination, should be considered within the disclosure of this application.

EXAMPLES

Example 1 is a computing system for implementing an Application Programming Interface (API) gateway, the computing system comprising: at least one hardware processor programmed to perform operations comprising: receiving, by the API gateway, an API call directed to an exposed API associated with a backend system; executing, by the API gateway, a trained computerized model based at least in part on the API call, and at least in part on API call contextual data associated with the API call; determining, by the API gateway, a routing action for the API call based at least in part on an output of the trained computerized model; and performing, by the API gateway, the routing action for the API call.

In Example 2, the subject matter of Example 1 optionally includes the routing action for the API call comprising routing the API call to a first server associated with the exposed API.

In Example 3, the subject matter of any one or more of Examples 1-2 optionally include the routing action for the API call comprising denying the API call.

In Example 4, the subject matter of any one or more of Examples 1-3 optionally include the routing action for the API call comprising routing the API call to the exposed API with first content data describing first content to be returned in response to the API call.

In Example 5, the subject matter of any one or more of Examples 1-4 optionally include the output of the trained computerized model indicating a first authentication process, the routing action for the API call comprising: determining that the API call passes a authentication process; and after determining that the API call passes the authentication process, routing the API call to the exposed API.

In Example 6, the subject matter of any one or more of Examples 1-5 optionally include the routing action for the API call comprising routing the API call to a version of the exposed API, the version being indicated by the output of the trained computerized model.

In Example 7, the subject matter of any one or more of Examples 1-6 optionally include the output of the trained computerized model indicating an error response associated with the API call, the operations further comprising: detecting, by the API gateway, an error associated with the exposed API; and executing the error response, the executing of the error response comprising at least one of denying the API call or routing the API call to a backup server associated with the exposed API.

In Example 8, the subject matter of any one or more of Examples 1-7 optionally include the API call contextual data comprising originating user data describing a originating user associated with the API call, the originating user data comprising at least one of user history data describing past API calls made by the originating user, user preference data describing at least one preference of the originating user, or user account data describing an account of the originating user.

In Example 9, the subject matter of any one or more of Examples 1-8 optionally include the API call contextual data comprising network load data describing a load of at least one network between the API gateway and the exposed API.

In Example 10, the subject matter of any one or more of Examples 1-9 optionally include the API call contextual data comprising communication session data describing a type of communication session associated with the API call.

In Example 11, the subject matter of any one or more of Examples 1-10 optionally include the API call contextual data comprising geographic data describing a geographic location from which the API call originated.

In Example 12, the subject matter of any one or more of Examples 1-11 optionally include the API call contextual data comprising network data describing a network from which the API call originated.

In Example 13, the subject matter of any one or more of Examples 1-12 optionally include the API call contextual data comprising version data describing a version of a sending application associated with the API call.

In Example 14, the subject matter of any one or more of Examples 1-13 optionally include the API call contextual data comprising time data describing a time of day when the API call was made.

Example 15 is a method of operating an Application Programming Interface (API) gateway, the method comprising: receiving, by the API gateway, an API call directed to an exposed API associated with a backend system; executing, by the API gateway, a trained computerized model based at least in part on the API call, and at least in part on API call contextual data associated with the API call; determining, by the API gateway, a routing action for the API call based at least in part on an output of the trained computerized model; and performing, by the API gateway, the routing action for the API call.

In Example 16, the subject matter of Example 15 optionally includes the routing action for the API call comprising routing the API call to a first server associated with the exposed API.

In Example 17, the subject matter of any one or more of Examples 15-16 optionally include the routing action for the API call comprising denying the API call.

In Example 18, the subject matter of any one or more of Examples 15-17 optionally include the routing action for the API call comprising routing the API call to the exposed API with first content data describing first content to be returned in response to the API call.

In Example 19, the subject matter of any one or more of Examples 15-18 optionally include the output of the trained computerized model indicating a first authentication process, the routing action for the API call comprising: determining that the API call passes a authentication process; and after determining that the API call passes the authentication process, routing the API call to the exposed API.

Example 20 is a non-transitory machine-readable medium comprising instructions thereon that, when executed by at least one hardware processor, because the at least one hardware processor to perform operations comprising: receiving an API call directed to an exposed API associated with a backend system; executing a trained computerized model based at least in part on the API call, and at least in part on API call contextual data associated with the API call; determining a routing action for the API call based at least in part on an output of the trained computerized model; and performing the routing action for the API call.

Figure 9:
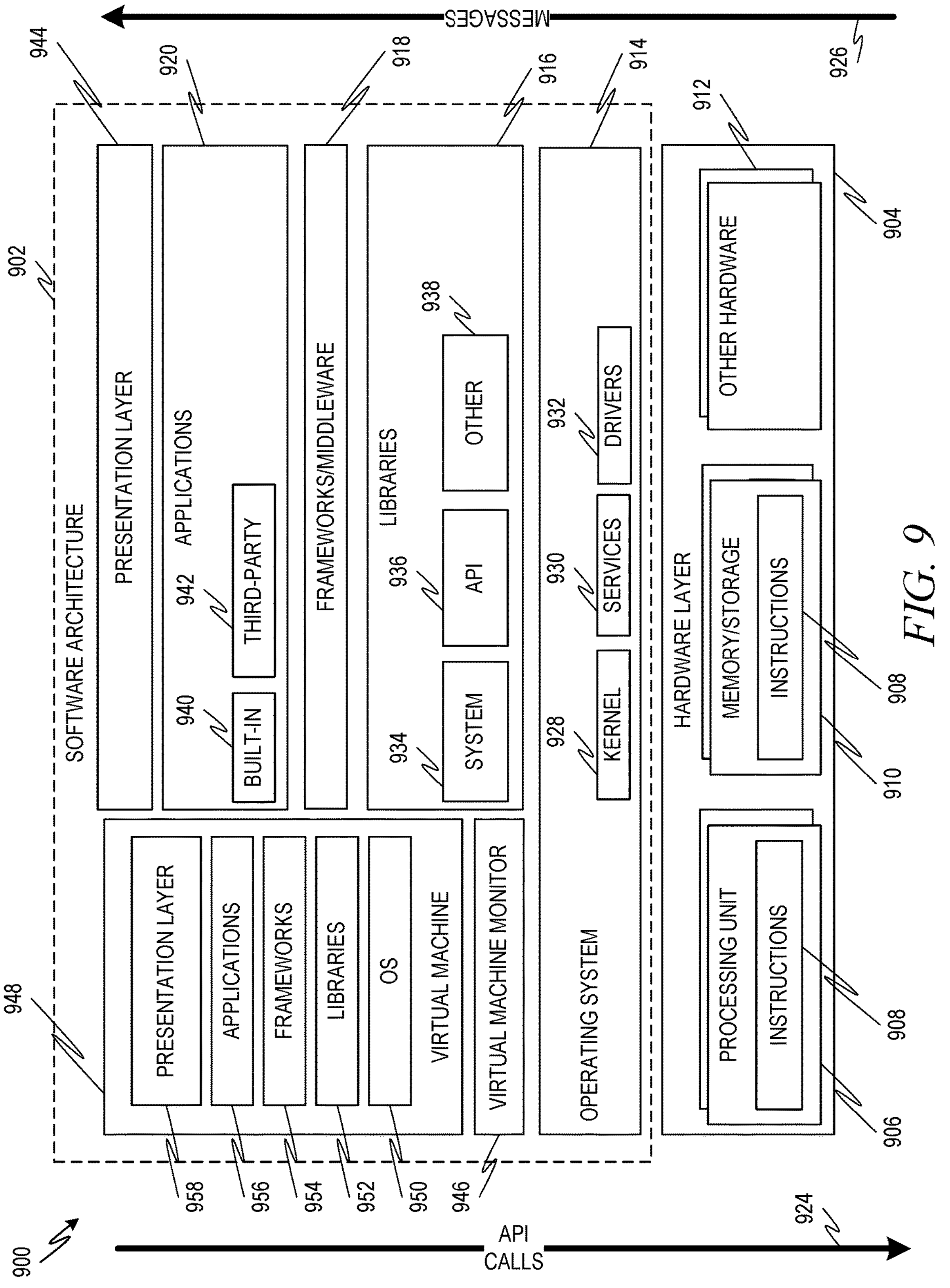
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. The software architecture 902 and various other components described in FIG. 9 may be used to implement various other systems described herein. For example, the software architecture 902 shows one example way for implementing an API gateway 102, computing system 104, 106, or other computing devices described herein.

In FIG. 9, A representative hardware layer 904 is illustrated and can represent, for example, any of the above referenced computing devices. In some examples, the hardware layer 904 may be implemented according to the architecture of the computer system of FIG. 9.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 which represents any other hardware of the hardware layer 904, such as the other hardware illustrated as part of the architecture 902.

In the example architecture of FIG. 9, the software architecture 902 may be conceptualized as a stack of layers where each layer provides particular functionality. For example, the software architecture 902 may include layers such as an operating system 914, libraries 916, middleware layer 918 (sometimes referred to as frameworks), applications 920, and presentation layer 944. Operationally, the applications 920 and/or other components within the layers may invoke API calls 924 through the software stack and access a response, returned values, and so forth illustrated as messages 926 in response to the API calls 924. The layers illustrated are representative in nature and not all software architectures have all layers. For example, some mobile or special purpose operating systems may not provide the middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and/or the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and/or the like. The libraries 916 may also include a wide variety of other libraries 938 to provide many other APIs to the applications 920 and other software components/modules.

The middleware layer 918 (also sometimes referred to as middleware) may provide a higher-level common infrastructure that may be utilized by the applications 920 and/or other software components/modules. For example, the middleware layer 918 may provide various graphic user interface (GUI) functions, high-level resource management, high-level location services, and so forth. The middleware layer 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930 and/or drivers 932), libraries (e.g., system 934, API libraries 936, and other libraries 938), and middleware layer 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. For example, the various environments described herein may implement one or more virtual machines executing to provide a software application or service. The example of FIG. 9 illustrates by virtual machine 948. A virtual machine creates a software environment where applications/modules can execute as if they were executing on a hardware computing device. A virtual machine 948 is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture executing within the virtual machine 948 can be the same as corresponding layers previously described or may be different.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

Computer software, including code for implementing software services can be written in any form of programming language, including compiled or interpreted languages, and it can be deployed in any form, including as a standalone program or as a module, subroutine, or other unit suitable for use in a computing environment. Computer software can be deployed to be executed on one computer or on multiple computers at one site or distributed across multiple sites and interconnected by a communication network.

In example embodiments, operations may be performed by one or more programmable processors executing a computer program to perform functions by operating on input data and generating output.

Figure 10:
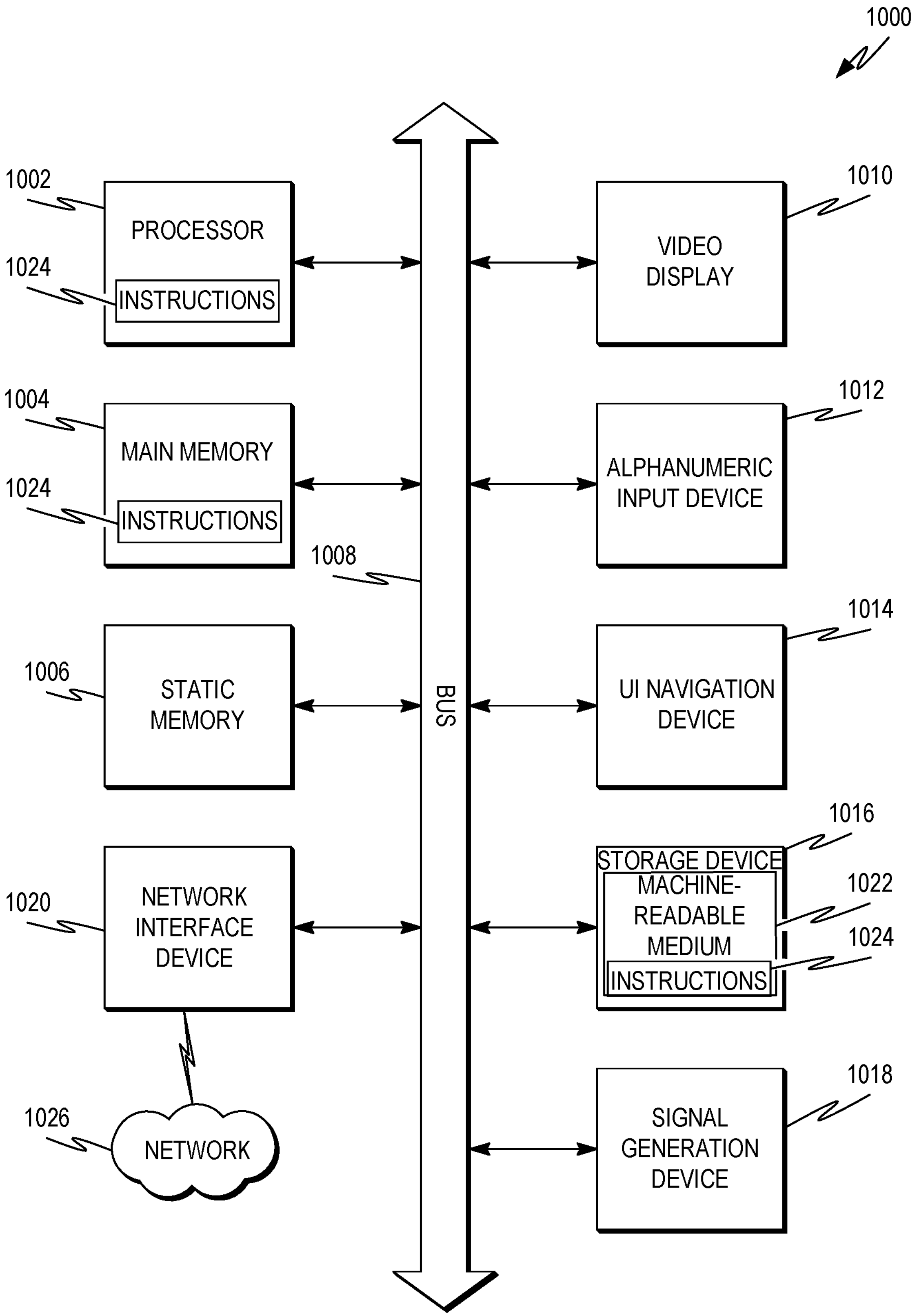
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive unit 1016, a signal generation device 1018 (e.g., a speaker), and a network interface device 1020.

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computing system for implementing an Application Programming Interface (API) gateway, the computing system comprising:

at least one hardware processor programmed to perform operations comprising:

receiving, by the API gateway, an API call directed to an exposed API associated with a backend system;

executing, by the API gateway, a trained computerized model based at least in part on the API call, and at least in part on API call contextual data associated with the API call;

generating first content data describing first content to be returned in response to the API call, the generating of the first content data being based at least in part on an output of the trained computerized model;

determining, by the API gateway, a routing action for the API call based at least in part on an output of the trained computerized model, the routing action for the API call comprising routing the API call to the exposed API with the first content data; and performing, by the API gateway, the routing action for the API call.

2. The computing system of claim 1, the routing action for the API call comprising routing the API call to a first server associated with the exposed API.

3. The computing system of claim 1, the routing action for the API call comprising denying the API call.

4. The computing system of claim 1, the output of the trained computerized model indicating a first authentication process, the routing action for the API call comprising:

determining that the API call passes an authentication process; and after determining that the API call passes the authentication process, routing the API call to the exposed API.

5. The computing system of claim 1, the routing action for the API call comprising routing the API call to a version of the exposed API, the version being indicated by the output of the trained computerized model.

6. The computing system of claim 1, the output of the trained computerized model indicating an error response associated with the API call, the operations further comprising:

detecting, by the API gateway, an error associated with the exposed API; and executing the error response, the executing of the error response comprising at least one of denying the API call or routing the API call to a backup server associated with the exposed API.

7. The computing system of claim 1, the API call contextual data comprising originating user data describing a originating user associated with the API call, the originating user data comprising at least one of user history data describing past API calls made by the originating user, user preference data describing at least one preference of the originating user, or user account data describing an account of the originating user.

8. The computing system of claim 1, the API call contextual data comprising network load data describing a load of at least one network between the API gateway and the exposed API.

9. The computing system of claim 1, the API call contextual data comprising communication session data describing a type of communication session associated with the API call.

10. The computing system of claim 1, the API call contextual data comprising geographic data describing a geographic location from which the API call originated.

11. The computing system of claim 1, the API call contextual data comprising network data describing a network from which the API call originated.

12. The computing system of claim 1, the API call contextual data comprising version data describing a version of a sending application associated with the API call.

13. The computing system of claim 1, the API call contextual data comprising time data describing a time of day when the API call was made.

14. A method of operating an Application Programming Interface (API) gateway, the method comprising:

receiving, by the API gateway, an API call directed to an exposed API associated with a backend system;

executing, by the API gateway, a trained computerized model based at least in part on the API call, and at least in part on API call contextual data associated with the API call;

generating first content data describing first content to be returned in response to the API call, the generating of the first content data being based at least in part on an output of the trained computerized model;

determining, by the API gateway, a routing action for the API call based at least in part on an output of the trained computerized model, the routing action for the API call comprising routing the API call to the exposed API with the first content data; and performing, by the API gateway, the routing action for the API call.

15. The method of claim 14, the routing action for the API call comprising routing the API call to a first server associated with the exposed API.

16. The method of claim 14, the routing action for the API call comprising denying the API call.

17. The method of claim 14, the output of the trained computerized model indicating a first authentication process, the routing action for the API call comprising:

determining that the API call passes an authentication process; and after determining that the API call passes the authentication process, routing the API call to the exposed API.

18. A non-transitory machine-readable medium comprising instructions thereon that, when executed by at least one hardware processor, cause the at least one hardware processor to perform operations comprising:

receiving an API call directed to an exposed API associated with a backend system;

executing a trained computerized model based at least in part on the API call, and at least in part on API call contextual data associated with the API call;

generating first content data describing first content to be returned in response to the API call, the generating of the first content data being based at least in part on an output of the trained computerized model;

determining a routing action for the API call based at least in part on an output of the trained computerized model, the routing action for the API call comprising routing the API call to the exposed API with the first content data; and performing the routing action for the API call.

19. The non-transitory machine-readable medium of claim 18, the routing action for the API call comprising routing the API call to a first server associated with the exposed API.

20. The non-transitory machine-readable medium of claim 18, the routing action for the API call comprising denying the API call.

* * * * *